United States Patent [19]

Fonsalas

[11] Patent Number: 4,839,836
[45] Date of Patent: Jun. 13, 1989

[54] SIGNAL TRANSIENT IMPROVEMENT ARRANGEMENT

[75] Inventor: Frédéric Fonsalas, Grigny, France

[73] Assignee: U.S. Philips Corporation, New York, N.Y.

[21] Appl. No.: 22,464

[22] Filed: Mar. 6, 1987

[30] Foreign Application Priority Data

Mar. 11, 1986 [FR] France ................ 86 03425

[51] Int. Cl.⁴ ............... G06G 7/25; H04N 5/213; H04N 9/69
[52] U.S. Cl. ..................... 364/582; 358/31; 358/36; 358/37; 358/167
[58] Field of Search ............ 358/12, 31, 36, 37, 358/167; 364/574, 582; 375/99; 455/296

[56] References Cited

U.S. PATENT DOCUMENTS

| | | | |
|---|---|---|---|
| 4,032,966 | 6/1977 | Kenney et al. | 358/36 |
| 4,232,340 | 11/1980 | Fuhrer | 358/167 |
| 4,398,210 | 8/1983 | Liu et al. | 358/167 X |
| 4,587,620 | 5/1986 | Niimi et al. | 455/296 X |
| 4,701,787 | 10/1987 | Fujiwara | 358/36 |

Primary Examiner—Parshotam S. Lall
Assistant Examiner—Edward R. Cosimano
Attorney, Agent, or Firm—Edward W. Goodman

[57] ABSTRACT

Processing arrangement for enhancing signal contours of a signal, having a transition zone between low-amplitude and high-amplitude areas, including a device for multiplexing the samples of the input signal processed during the duration of the transition zone and non-processed samples located outside said zone. This multiplexing device is preceded by a first non-processed input sample transfer path (1) and, parallel thereto, a second path (2) for transferring processed input samples, the second transfer path including:

(1) a circuit (10, 20, 30) for calculating the derivative and the sign of the derivative of the input signal;
(2) a normalization circuit (50, 60, 70, 80, 90, 100);
(3) a transformation circuit (1) for replacing each output value x of the first multiplier by a numerical equivalent of a function f(x) if x is not higher than ½, or by a numerical equivalent of a function $1 - F(1 - x)$ when x is higher than ½; and
(4) a denormalization circuit (120, 130, 140, 150).

15 Claims, 3 Drawing Sheets

4,839,836

SIGNAL TRANSIENT IMPROVEMENT ARRANGEMENT

BACKGROUND OF THE INVENTION

The present invention relates to an improved signal transient processing arrangement comprising means for inserting signal portions processed during transients in the signal, between non-processed signal portions.

Such an arrangement is more specifically useful for enhancing picture contours and, in particular, to enhancing chrominance or luminance contours in a television picture obtained by means of a video-frequency signal encoded in accordance with a MAC standard, so as to improve the subjective quality of the picture.

An arrangement of this type is illustrated in FIG. 8 of the article "Adaptive Techniken bei der digitale Videosignalverarbeitung in Farbfernsehempfangern" by M. Jacobsen, published in the periodical Fernseh- und Kinotechnik, No. 6/1983, pages 245-250. The processed signal portions in that case are obtained by delaying and interpolating original signal portions.

SUMMARY OF THE INVENTION

It is an object of the invention to provide an improved signal transient arrangement having for its object the improvement of the subjective quality of a processed signal.

To that effect, the invention relates to an arrangement as mentioned above which is characterized in that it comprises, sampling means for sampling an input signal and thereby obtaining input signal samples; normalization means for normalizing values of the input signal samples during transients in the input signal, said normalization means normalizing a value of a first transient signal sample to zero and a value of a last transient sample to one;

transformation means for replacing normalized values of transient signal samples normalized by the normalization means with values derived from a predetermined transformation function independent of signal sample values located outside the transients, and which are substantially symmetrical with respect to a normalized value of one-half; and denormalization means for denormalizing a signal transformed by the transformation means, to adapt its dynamics to the dynamics of the input signal.

An arrangement according to the invention further optionally offers the possibility of varying the transition enhancement effect by varying the transformations.

One specific embodiment of the invention, is characterized in that the predetermined transformation is a polynomial transformation which replaces normalized transient sample value x by a polynomial value P(x) when the value of x is less than one-half, and by a polynomial value $1-P(1-x)$ when the value of x is between one-half and one. This transformation can also be a function F(x) when the value of x is less than one-half, and $1-F(1-x)$ when the value of x is between one-half and one.

A further embodiment of the invention is characterized in that it comprises a first transfer path for all of the transient signal samples, and parallel thereto a second transfer path for processed input signal samples, said second transfer path comprising the normalization means, the transformation means and the denormalization means, the embodiment further comprising:

a derivative determining circuit for determining the derivative of the input signal; and a logic control circuit receiving the output of said derivative determining circuit and producing control signals for controlling different parts of the improved signal transient arrangement.

BRIEF DESCRIPTION OF THE DRAWINGS

Particulars and advantages of the invention will become more apparent from the following description given, by way of non-limitative example, with reference to the accompanying drawings, in which FIG. 1a, 1b, 1c respectively show examples of an original signal to be processed, a corresponding curve—in the form of square waves—representing the arithmetic sign of the derivative of said original signal, and a modified curve representing the arithmetic sign of the derivation for long transients.

DETAILED DESCRIPTION OF THE INVENTION

Let it first be assumed that in the present case, the processing arrangement has for its object to provide a signal for developing an image in the form of a matrix of picture samples. In this matrix, lines contain picture samples in the horizontal direction and columns contain picture samples in the vertical direction, contour enhancement being effected in one of these two directions. Let is also be assumed that the input signal is sampled at a sampling frequency which is sufficiently high with respect to its passband so as to ensure that transients of the input signal contain an adequate number of samples (at least 4 or 5, for example).

Figures 1A, 1B, 1C:
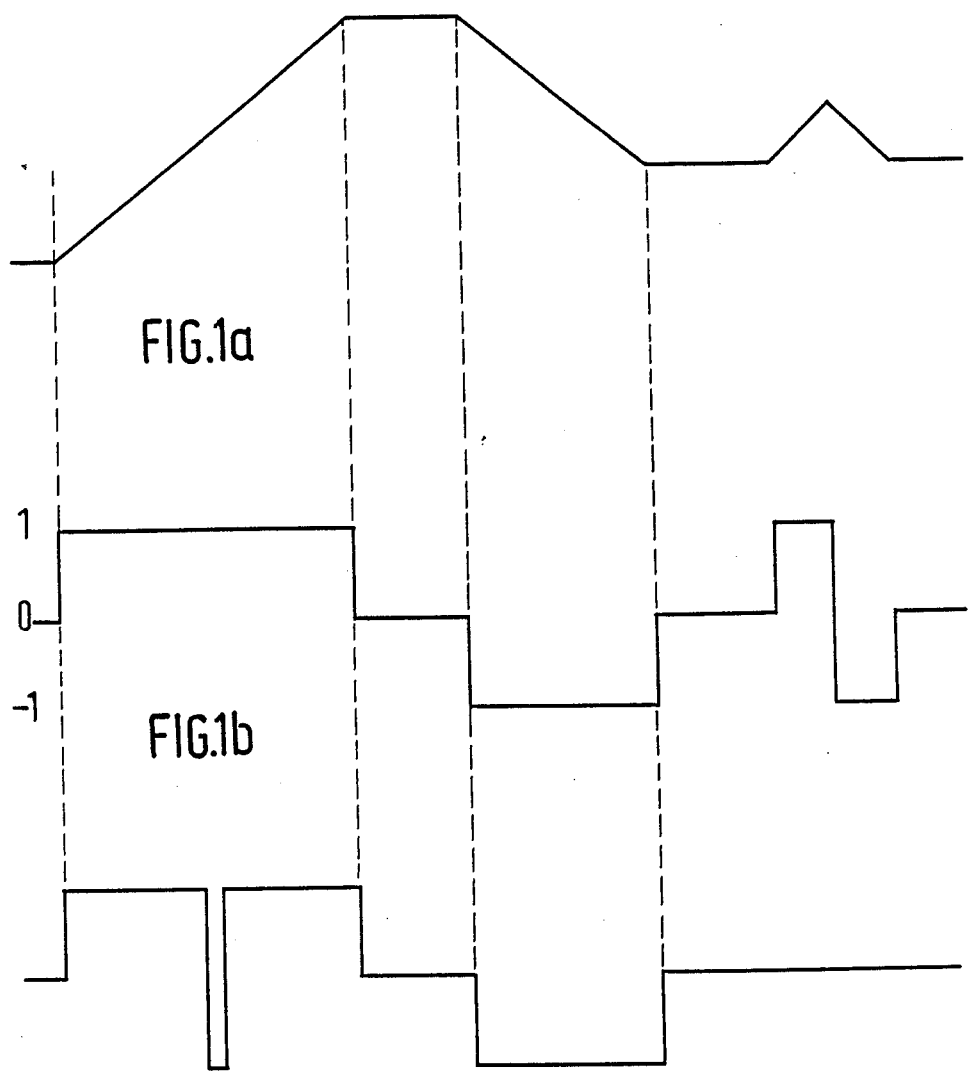

The contour enhancement according to the invention then proceeds as follows. First the derivative and the sign of the derivative of the signal is calculated, on the basis of the difference between two consecutive input signal samples ($x_{n-1}$ and $x_n$ respectively), this sign being expressed by 1, 0, $-1$ depending on whether said difference $x_n - x_{n-1}$ is positive, zero or negative. For an original input signal such as the signal shown in FIG. 1a, the sign of the derivative is given by the curve of FIG. 1b. An upper time limit is used for the duration of the square-wave signals thus obtained to prevent sudden rectification of zones comprising transients having a large number of samples, for example zones where a gradual change from shadow to light occurs. In that case, the derivation sign signal is split into square-wave signal of limited duration, in this case two, corresponding to transient sections which are shown on the left hand portion of FIG. 1c. Further, a transient normalization operation is effected which has for its object to adjust the value of the first input signal sample of a transient section to a value of 0 and the value of the last input signal sample of this section point to a value of 1.

Subsequently, a polynomial transformation is effected using a suitable polynomial which may be of a very great diversity, and adaptable to a specific case. For instance a transformation using functions such as exponential, arctangential functions, etc. might be used. Finally, after the transformation, a denormalization operation is effected which is the opposite of the previous normalization operation to recover the initial dynamics of the signal, whereafter the multiplexing of samples processed during the transient period of the input signal and non-processed samples situated before and after this transient period is ensured, in order to recover a complete signal.

A specific embodiment of such a signal transient improvement arrangement for enhancing the contours in the colors of a television picture produced by transients of a television signal encoded in accordance with the D2-MAC-packet standard, will now be described. This description is given with reference to FIG. 2, which shows practical example of such an arrangement. The description will first be directed to the processing operation applied in the horizontal direction, that is to say along scanning lines of a picture analysing system using, in this described example, a 13.5 MHz sampling rate of the color difference signal and a passband of these signals of approximately one-fifth of this value. These characteristics have led to a division into n sections of transients each comprising a number of ten samples.

Figure 2:
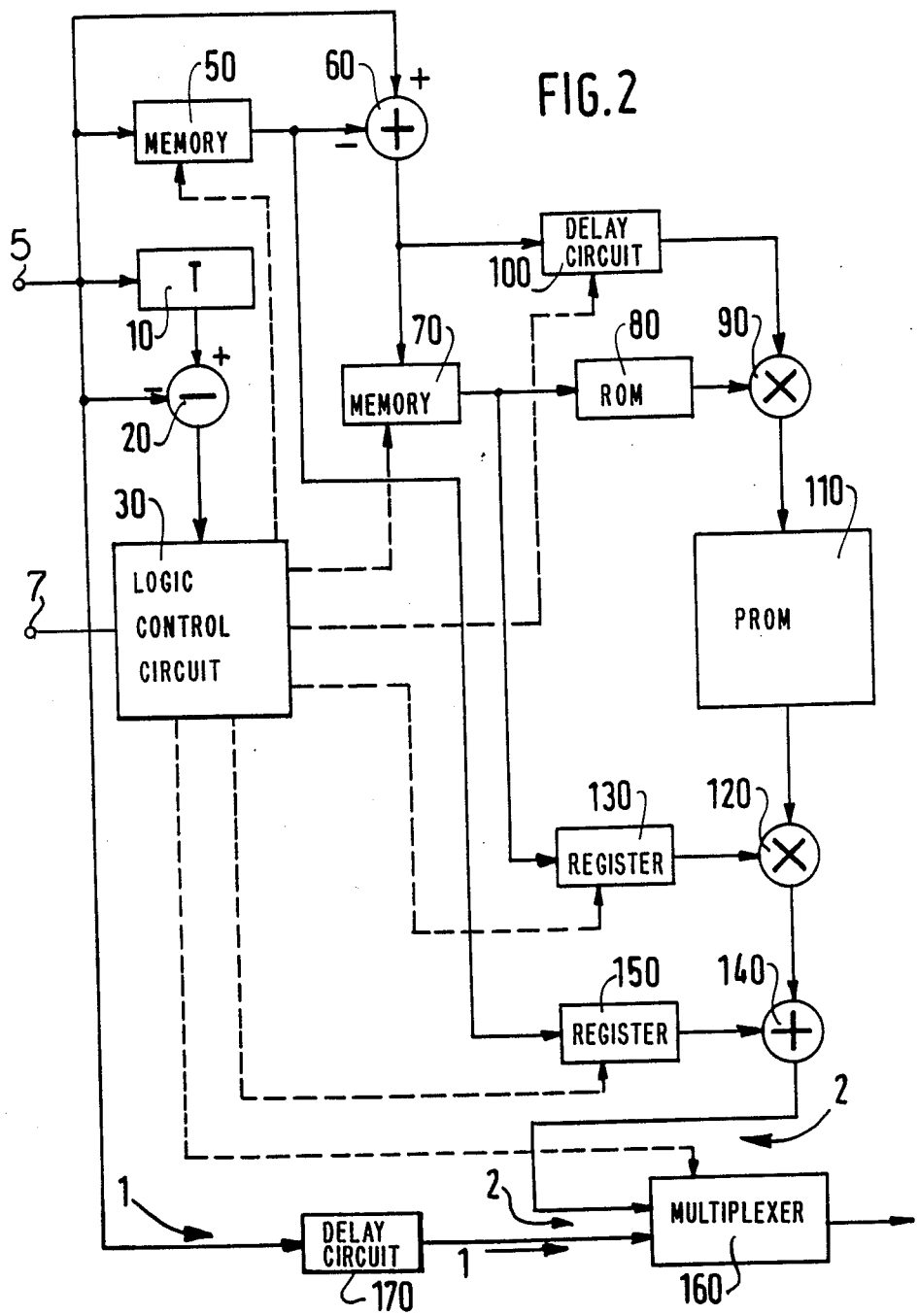
FIG. 2 shows an embodiment of a processing arrangement according to the invention.

The arrangement shown in FIG. 2 comprises a circuit (10, 20, 30) for calculating the derivative and the sign of the derivative of a sampled input signal, formed by a first delay circuit 10, a first subtracter 20 and a logic control circuit 30. The delay circuit 10 delays the input signal samples at input terminal 5 by a sampling period T and the subtracter 20 receives the delayed output samples $x_{n-1}$ from the delay circuit 10 and also, the input signal sample $x_n$ from input terminal 5. The logic control circuit 30, which receives the output signal of the subtracter 20 along with the sampling clock signal on terminal 7, then produces square waves corresponding to the transients in the input signals and having an amplitude $+1$, or $-1$ depending on whether the sign of $x_{n-1} - x_n$ is positive or negative. Simultaneously, logic control circuit 30 splits those of these square waves which have a duration longer than a threshold period fixed at, for example ten sampling periods, this splitting operation being effected on as many sections as necessary to ensure that no section exceeds the fixed length of the threshold period. Based on these square waves, the logic control circuit 30 determines the start and end of a transient and generates control signals for controlling the respective read and write sequences of the memories and registers used in the overall arrangement.

The arrangement further includes a normalization circuit 50, 60, 70, 80, 90, 100. This normalization circuit includes a first memory 50 connected to input terminal 5 which stores the value of the first sample of a transient section of the sampled signal, and a second subtracter 60 which subtracts this value from the values of subsequent signal samples, these difference values being delayed in delay circuit 100 for at least the duration of the transient section. The normalization circuit also includes, provided at the output of the subtracter 60, a second memory 70 which stores the difference value of the last and the first sample of a transient section of the sampled signal. A read-only memory 80 contains a lookup table of the inverse value of this stored value. A first multiplier 90 receives this inverse value from memory 80 and multiples each of the output values of the subtracter 60, conveyed to the other input of the multiplier via second delay circuit 100 by the inverse value. The normalized signal value which is obtained first by the action of the components 50 and 60 and thereafer, by the action of the components 70, 80, 90 and 100 is available at the output of the multiplier 90.

Thereafter, a polynomial transformation centered around the normalized value of one-half is applied to this normalized signal, the values of which are not comprised between 0 and 1.

Figure 3A:
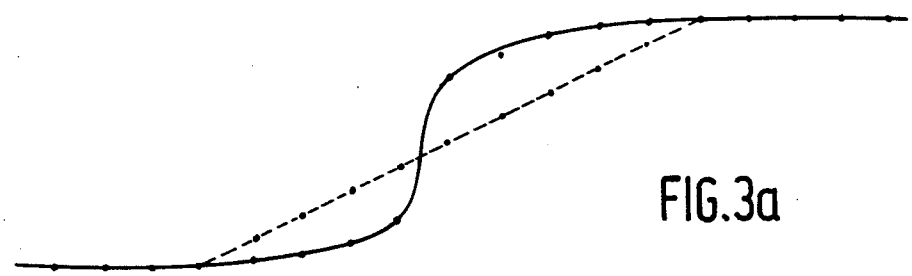
FIGS. 3a to 3c show three examples of contour enhancement obtained by polynomial transformation using polynomials of the respective types $x^2$, $2^{p-1} x P$, and $ax^3 + bx$.
Figure 3B:
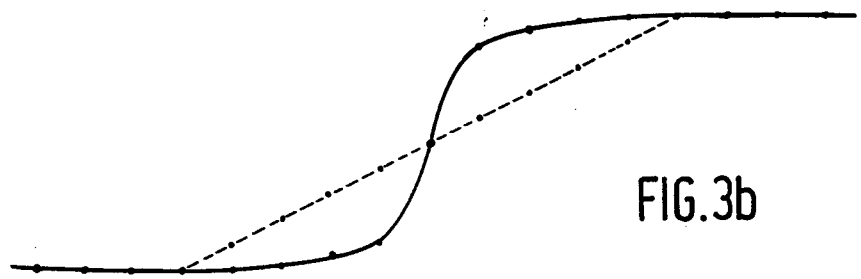
Figure 3C:
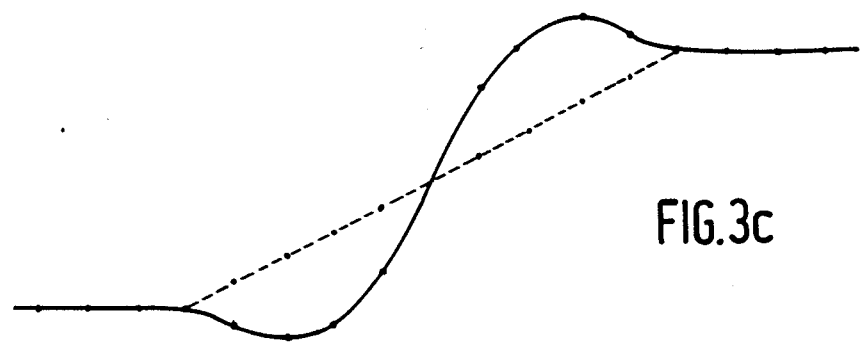

In the practical examples described herein, the arrangement according to the invention includes a read-only memory 110 of the PROM type, which can optionally be programmed depending on the specific contour enhancement one wants to effect. In particular, the memory 110 contains a lookup table in which the respective normalized values are the addresses in the memory while the contents of the memory at the respective addresses are the values in accordance with the desired function. FIGS. 3a to 3c show three distinct examples of contour enhancement obtained by using three specific polynomial transformation types (the original contour is represented by a broken line and the enhanced contour by a solid line):

(a) is the case where the polynomial is a squaring function (FIG. 3a): each normalized input value x is replaced by an output value $x^2$ if the normalized value of x is equal to zero or between 0 and $\frac{1}{2}$, and by $1-(1-x)^2$ if the normalized value of x is between $\frac{1}{2}$ and 1 or is equal to one of these two limit values;

(b) is the case where the polynomial used as the transformation is $2^{p-1}x^p$ (FIG. 3b): each normalized input value x is replaced by an output value $2^{p-1}x^p$ if it is equal to zero or between 0 and $\frac{1}{2}$, and by $1-2^{p-1}(1-x)^p$ if the normalized value of x is between $\frac{1}{2}$ and 1 or is equal to either of these two limit values; and (c) is the case where the polynomial is $ax^3+bx$ (FIG. 3c): each normalized value x is replaced by an output value $ax^3+bx$ if it is equal to zero or between 0 and $\frac{1}{2}$ and by $1-(a(1-x)^3+b(1-x))$ if the normalized value of x is between $\frac{1}{2}$ and 1 or is equal to either of these two limit values, where coefficients a and b have, for example, been chosen so that $a=4/(1-12x_0^2)$ and $b=-3x_0^2$, where $x_0$ is a coefficient whose value determines the importance of the contour enhancement to a greater or less degree.

Finally, the arrangement according to the invention has, at the output of the memory 110, a denormalization circuit (120, 130, 140, 150) by means of which the initial dynamics of the signal can be recovered. The denormalization circuit includes a multiplier 120 which multiplies the output of the memory 110 by the output of a first register 130 which has retained in its memory, in view of this multiplication, the values of the last sample of the transient section utilized by the second memory 70 for the normalization operation, and an adder 140 for adding together the output of the multiplier 120 and the output of a second register 150 which has preserved in its memory the value of the first sample of the transient section (the value which was initially stored in the first memory 50). The output of the adder 140, which supplies the denormalized signal, is conveyed to a multiplexer 160, which, in addition, receives the output of a third delay circuit 170 which receives and delays the input signals on terminal 5, as does circuit 108, and has for is object to compensate for the transit time. Multiplexer 160 provides multiplexing of the non-transient samples, located before and after the processed transient, which it receives via the transfer path 1 from terminal 5, and of samples processed with the aid of the components 10 to 150 which are transmitted to the multiplexer via the parallel transfer path 2. The output of the multiplexer 160 then supplies the signal with enhanced contours compared with the input signal.

Control signal paths shown as dashed lines in the drawings, provide logic control signals to the first memory 50, to the second memory 70, to the third delay circuit 100 to the register 130, to the register 150 and to the multiplexer 160, for an appropriate synchronization of the various operations.

As noted above, the logic control circuit 30 determines the start and end of a transient section in the input signal. Based on this, the logic control circuit 30 generates a write signal to memory 50 to write therein the first transient signal sample and then generates respective read signals therefor corresponding to the subsequent transient signal samples such that the first transient signal sample is repeatedly available at subtracter 60. Similarly, the logic control circuit 30 generates a write signal to the memory 70 to write therein the difference of the last and the first transient signal samples and then repeatedly generates read signals therefor such that the ROM 80 repeatedly provides the inverse value thereof for the multiplier 90. The logic control circuit 30 further applies a control signal to the delay 100 such that it delays the signal applied thereto for the duration of the relevant transient section. Similarly, the logic control circuit 30 generates control signals for the registers 130 and 150 such; that they repeatedly provide the contents of memories 70 and 50, respectively. Finally, the logic control circuit 30 generates switching signals for the multiplexer 160 such that the processed signals at the output of adder 140 replace the transient section in the input signal having been delayed in the delay 170. It should be understood that the timing of all of the control signals from the logic control circuit 30 are adjusted based on the delay time of delay 170.

The invention described in the foregoing is not limited to the specific embodiment described and shown in the drawings, on the basis of which variations can be proposed without departing from the scope of the inventon. It is, for example, possible to enlarge the possibilities of the logic control circuit 30. More specifically, it is possible to request this circuit to remove from the polynomial transformation control signal small consecutive square waves of opposite amplitudes (an example thereof is shown in the right hand part of FIG. 1b) which correspond to abrupt noise-induced transitions (FIG. 1c does effectively not comprise these square waves).

Moreover, it will be obvious that the invention is applicable in a very general manner to improve the subjective quality of all types of pictures or representations which are at least bidimensional; that is to say, not only in the field of television, but, also in medical or infrared imaging.

Finally, the polynomial transformation described as a basic processing operation in accordance with the invention is not the only possible type of transformation. Other transformation modes based on logarithms, exponentials, trigonometrical functions etc., can of course also be used, provided they respect the symmetry discussed herein.

I claim:

1. A signal transient processing arrangement comprising means for replacing transient in an input signal with signal portions processed during said transients, sampling means for sampling said input signal for obtaining a plurality of input signal samples, and means for forming said processed signal portions, wherein said processed signal portions forming means comprises:

normalization means for normalizing values of the input signal samples obtained during said transients, said normalization means normalizing the value of a first transient signal sample to zero and normalizing the value of a last transient signal sample to one;

transformation means for replacing value of said transient signal samples normalized by the normalization means with values determined in accordance with a predetermined transformation; and denormalization means for denormalizing signal samples transformed by the transformation means.

2. A signal transient processing arrangement as claimed in claim 1, wherein said predetermined transformation is a polynomial transformation which replaces a normalized transient signal sample value x by a value of a polynomial P(x) when x has a value of less than one-half and by a value of a polynomial $1-P(1-x)$ when the normalized transient signal sample value x has a value between one-half and one.

3. A signal transient processing arrangement as claimed in claim 1 further comprising: a first transfer path for said input signal samples and, parallel thereto, and a second transfer path for processed input signal samples, said second transfer path comprising the normalization means, the transformation means and the denormalization means;

a derivative determining circuit for determining a derivative of said input signal; and a logic control circuit receiving an output of said derivative determining circuit and producing control signals in response thereto, for said normalization means, said transformation means, said denormalization means and said replacing means.

4. The signal transient processing arrangement of claim 1 wherein said predetermined transformation is at least one polynomial.

5. The signal transient processing arrangement of claim 4 wherein normalized transient signal samples having a value of less than one-half are replaced by a value of a first polynomial P(x) and normalized transient signal samples having a value of between one-half and one are replaced by a value of a second polynomial $1-P(1-x)$, where x represents said normalized value.

6. A signal transient processing arrangement as claimed in claim 5, further comprising a first transfer path for said input signal samples and, parallel thereto, a second transfer path for processed input signal samples, said second transfer path comprising said normalization means, said transformation means and said denormalization means;

a derivative determining circuit for determining a derivative of said input signal; and a logic control circuit receiving an output of said derivative determining circuit and producing control signals in response thereto, for said normalization means, said transformation means, said normalization means and said replacing means.

7. The signal transient processing arrangement of claim 3 wherein said normalization means comprises:

(a) first storage means for storing the value of said first transient signal sample;

(b) subtracter means connected to said first storage means, for providing a plurality of difference values by subtracting the value stored in said first storage means from each subsequent transient signal sample;

(c) delay means connected to said subtracter means, for delaying said difference values;

(d) second storage means connected to said substracter means, for storing the difference value of the last and first transient signal samples;

(e) inverter means connected to said second storage means, for inverting the value stored therein; and (f) first multiplier means connected to said inverter means and said delay means, for providing a normalized value for each of said difference values, by multiplying each of said delayed difference values by said inverted value.

8. A signal transient processing arrangement as claimed in claim 7, wherein the transformation means comprise a circuit for transforming each output value x of the first multiplier means by a polynomial P(x) when the value of x does not exceed ½ or by a polynomial 1−P(1−x) when the value of x is higher than ½.

9. A signal transient processing arrangement as claimed in claim 7, wherein said denormalization means comprises:

a second multiplier receiving an output of said transformation means and an output of a first register for storing a value previously stored in said second memory; and an adder for adding together an output of said second multiplier and an output of a second register for storing a value previously stored in said first memory, an output of said adder constituting an output of said second transfer path, and the control signals of said logic control circuit supplying respectively different read or write sequences for said first and second memories and said first and second register of the arrangement.

10. A signal transient processing arrangement as claimed in claim 7, wherein the transformation means comprises a circuit for transforming each output value x of the first multiplier means by a function F(x) when the value of x does not exceed ½, or by a function 1−F(x) when the value of x is higher than ½.

11. A signal processing arrangement comprising:

(a) sampling means for sampling an input signal containing transient portions and non-transient portions, thereby obtaining a plurality of transient signal samples and non-transient signal samples;

(b) normalization means connected to said sampling means, for normalizing values of said transient signal samples, thereby obtaining a plurality of normalized signal samples;

(c) transformation means connected to said normalization means, for replacing said normalized signal samples with values derived in accordance with a predetermined transformation, thereby obtaining a plurality of transformed signal samples;

(d) denormalization means connected to said transformation means, for denormalizing said transformed signal samples, thereby obtaining a plurality of enhanced transient signal samples; and (e) means connected to said sampling means and said denormalization means, for combining said non-transient signal samples and said enhanced transient signal samples.

12. The signal processing arrangement of claim 11 wherein said normalized signal samples have values in the range of zero to one.

13. The signal transient processing arrangement of claim 12, wherein said normalization means comprises:

(a) first storage means for storing a value of a first transient signal sample;

(b) subtracter means connected to said sampling means and said first storage means, for providing a plurality of difference values by subtracting the value stored in said first storage means from each subsequent transient signal sample;

(c) delay means connected to said subtracter means, for storing said difference values;

(d) second storage means connected to said second subtracter means, for storing a difference value of a last transient signal sample and said first transient signal sample;

(e) inverter means connected to said second storage means, for inverting the difference value stored therein; and (f) first multiplier means connected to said delay means and said inverter means, for providing a normalized value for each of said difference values, by multiplying each of said difference values by said inverted value.

14. The signal transient processing arrangement of claim 12, wherein said predetermined transformation is at least one polynomial.

15. The signal transient processing arrangement of claim 14, wherein transient signal samples having normalized values of less than one-half are replaced by values of a first polynomial P(x), and transient signal samples having normalized values of between one-half and one are replaced by values of a second polynomial 1−P(1−x), where x represents each of said normalized values.

* * * * *